(12) United States Patent
Froeberg (10) Patent No.: US 6,674,849 B1
(45) Date of Patent: Jan. 6, 2004

(54) TELEPHONE PROVIDING DIRECTIONS TO A LOCATION

(75) Inventor: Peter L. Froeberg, Cupertino, CA (US)

(73) Assignee: Trimble Navigation Limited, Sunnyvale, CA (US)

(*) Notice: Subject to any disclaimer, the term of this patent is extended or adjusted under 35 U.S.C. 154(b) by 559 days.

(21) Appl. No.: 09/627,547

(22) Filed: Jul. 28, 2000

(51) Int. Cl.[7] ................................................ H04M 3/42
(52) U.S. Cl. ........................... 379/201.06; 379/201.07; 379/201.08; 701/201; 701/202
(58) Field of Search ............... 379/142.01, 142.04, 379/142.06, 201.06, 201.07, 201.08, 207.12, 207.15, 355.02, 355.04; 701/201, 202

(56) References Cited

U.S. PATENT DOCUMENTS

| | | | |
|---|---|---|---|
| 4,954,958 A | * 9/1990 | Savage et al. | 701/202 |
| 5,479,482 A | 12/1995 | Grimes | 379/59 |
| 5,625,668 A | 4/1997 | Loomis et al. | 379/58 |
| 5,727,057 A | 3/1998 | Emery et al. | 379/211 |
| 5,812,959 A | 9/1998 | Froeberg et al. | 701/117 |
| 6,021,371 A | 2/2000 | Fultz | 701/200 |
| 6,067,349 A | * 5/2000 | Suder et al. | 379/88.19 |
| 6,459,782 B1 | * 10/2002 | Bedrosian et al. | 379/201.08 |
| 6,487,495 B1 | * 11/2002 | Gale et al. | 701/209 |

* cited by examiner

*Primary Examiner*—Bing Bui
(74) *Attorney, Agent, or Firm*—Menlo Patent Agency LLC (57) ABSTRACT

A system providing a map and driving directions to a user of a user telephone for a remote location associated with a remote telephone number. The system includes the user telephone and a server connected through a telephone system. The user telephone includes a location number designator for designating a remote telephone number and an object decoder for decoding software objects such as a map object having map information for the area about the location of a remote address associated with the remote telephone number and a driving directions object having driving directions information for traveling to the remote location. The server includes a map object generator for generating the map object from the remote telephone number and a driving directions object generator for generating the driving directions object from the remote telephone number and user location determination information for a local address, a local telephone number, or geodetic coordinates provided by a geodetic location device in the user telephone.

15 Claims, 5 Drawing Sheets

TELEPHONE PROVIDING DIRECTIONS TO A LOCATION

BACKGROUND OF THE INVENTION

1. Field of the Invention

The invention relates generally to telephones and more particularly to a cellular telephone providing a map and driving directions for a remote location associated with a remote telephone number.

2. Description of the Prior Art

For three decades public call takers and dispatchers have had the capability known as automatic number identification (ANI) for identifying the telephone number of a 911 caller. This capability is now available to the general public with a service known as caller ID. In addition to ANI, E911 provides a capability known as automatic location identification (ALI) for translating the telephone number of the caller to a street address. It is the ANI/ALI capabilities that enable an E911 dispatcher to route emergency personnel to the caller without depending upon the accuracy of verbal information from the caller.

In more recent times, a capability known as geocoding has enabled E911 centers to convert a street address determined by ANI/ALI into a geodetic location, such as latitude and longitude, and to display a map of the local area about the street address to the dispatcher. The map can be important for public safety for removing ambiguity for locating street addresses and facilitating better dispatch to an emergency scene. The most advanced E911installations have the capability of tracking the mobile locations of emergency vehicles that are available or proceeding to the scene.

However, these capabilities, with the exception of caller ID, are not available to a general public user of a cellular or fixed telephone. General users of telephones have a need for generating a map and driving directions to a remote location associated with a remote telephone number.

SUMMARY OF THE INVENTION

It is therefore an object of the present invention to provide a system for providing a map and driving directions for a remote location associated with a remote telephone number designated with a user telephone.

Briefly, in a preferred embodiment, the system includes a user telephone and a server connected through the telephone system. The user telephone includes a location number designator for designating a remote telephone number and an object decoder for decoding software objects such as a map object having map information for the area about the remote location of a remote address associated with the remote telephone number and a driving directions object having driving directions information for traveling to the remote location. The server includes a map object generator for generating the map object from the remote telephone number and a driving directions object generator for generating the driving directions object from the remote telephone number and user location-determination information for a local address, a local telephone number, or local geodetic coordinates provided by a geodetic location device in the user telephone.

An advantage of the system of the present invention is that a user of a cellular telephone receives a map and/or driving directions for a remote location associated with a remote telephone number.

These and other objects and advantages of the present invention will no doubt become obvious to those of ordinary skill in the art after having read the following detailed description of the preferred embodiments which are illustrated in the various figures.

DETAILED DESCRIPTION OF THE PREFERRED EMBODIMENTS

Figure 1:
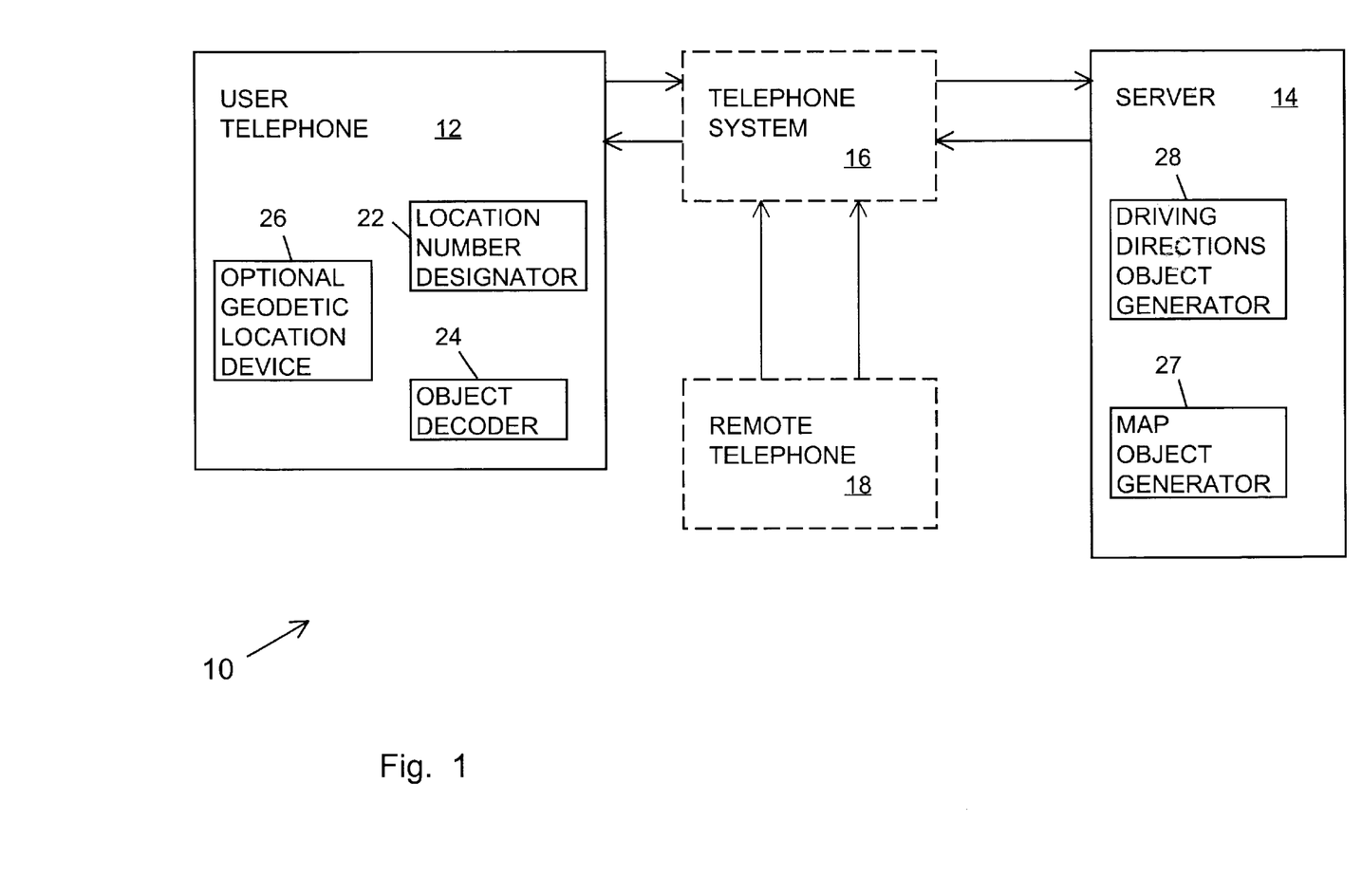
FIG. 1 is a block diagram of a communication system of the present invention comprising a user telephone and a server.

FIG. 1 is a block diagram of a system of the present invention referred to by the general reference number 10. The system 10 includes a user telephone 12 and a server 14 connected through a telephone system 16. A remote telephone 18 having a remote telephone number also connects into the telephone system 16. In a typical application the user telephone 12 is a cellular telephone with additional features of the present invention including a location number designator 22, an object decoder 24, and an optional geodetic location device 26. The telephone system 16 includes all the service providers, routing, switching, transponders, and lines for providing access, including wireless access, between the user telephone 12, the server 14, and the remote telephone 18. The server 14 is a computer adapted for communication into the telephone system having computer-readable programming of the present invention for a map object generator 27 and a driving directions object generator 28. A prior system described by Fultz in a United States patent for a "Communication and Navigation System Incorporating Position Determination" having a U.S. Pat. No. 6,021,371 is incorporated herein by reference.

Figure 2:
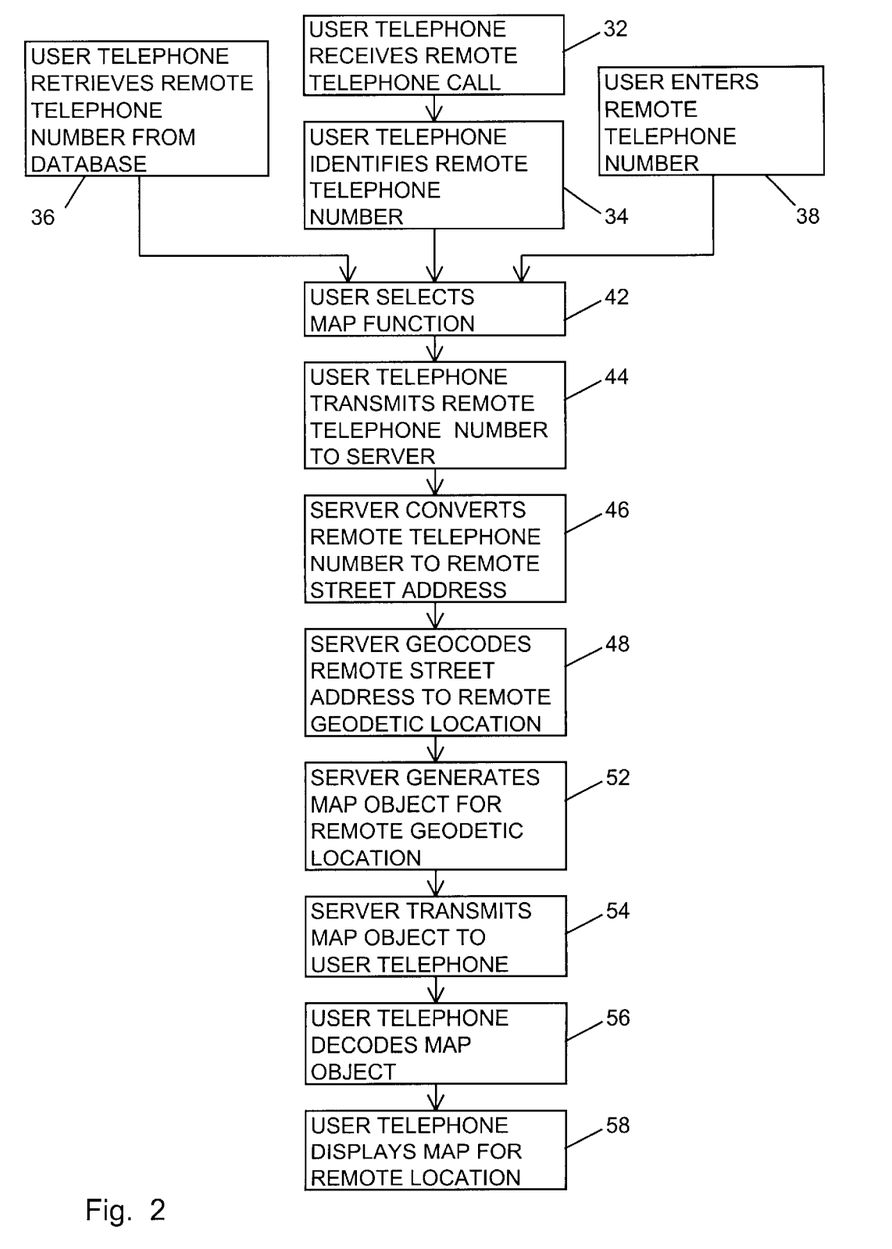
FIG. 2 is a flow chart for a method of the present invention for generating a map on the user telephone of FIG. 1 about a remote location associated with a remote telephone number.

FIG. 2 is flow chart of a method for generating a map on the user telephone 12 for a remote location associated with the remote telephone 18.

At the start, the user telephone 12 uses the location number designator 22 for designating a remote telephone number. This can be done in any one of three ways. First, in a step 32 the user telephone 12 receives a telephone call from the remote telephone 18 having the remote telephone number and then in a step 34 the location number designator 22 uses caller identification to identify the remote telephone number. Second, in a step 36 the user of the user telephone 12 instructs the location number designator 22 to use one of a set of stored telephone numbers as the remote telephone number. Third, in a step 38 the user manually enters the remote telephone number into the location number designator 22.

The user, in a step 42 selects the desired function from the user telephone 12, for example, "map". In a step 44 the user telephone 12 transmits a telephone call having the remote telephone number as message data through the telephone system 16 to the server 14. Of course, this use of the remote telephone number differs from the standard use of a destination telephone number in header data for routing and switching the telephone call through the telephone system 16. In the present invention, the message data includes the remote telephone number and the header data includes the telephone number of the server 14. Such message data is carried in the same way as a digitized voice conversation is carried to a human user of another telephone.

The server 14 in a step 46 converts the remote telephone number to an associated remote street address. If the remote telephone number is found to be invalid, the server 14 transmits an error indication through the telephone system 16 back to the user telephone 12. In a step 48 the server 14 geocodes the remote street address to a remote geodetic location such as a latitude and a longitude. In a step 52 the server 14 uses the remote geodetic location and a map database for generating a map object having information for a map of the area around the remote geodetic location, an indication of the remote geodetic location itself shown on the map, and a default map scale suitable for the remote geodetic location. The default scale would depend upon the intensity of map information in the area of the remote geodetic location.

In a step 54 the server 14 transmits a telephone message having the map object through the telephone system 16 to the user telephone 12. In a step 56 the object decoder 24 in the user telephone 12 decodes the map object with into map data the can be used for a map display. Then, in a step 58 the user telephone 12 displays the map to the user of the user telephone 12.

Figure 3:
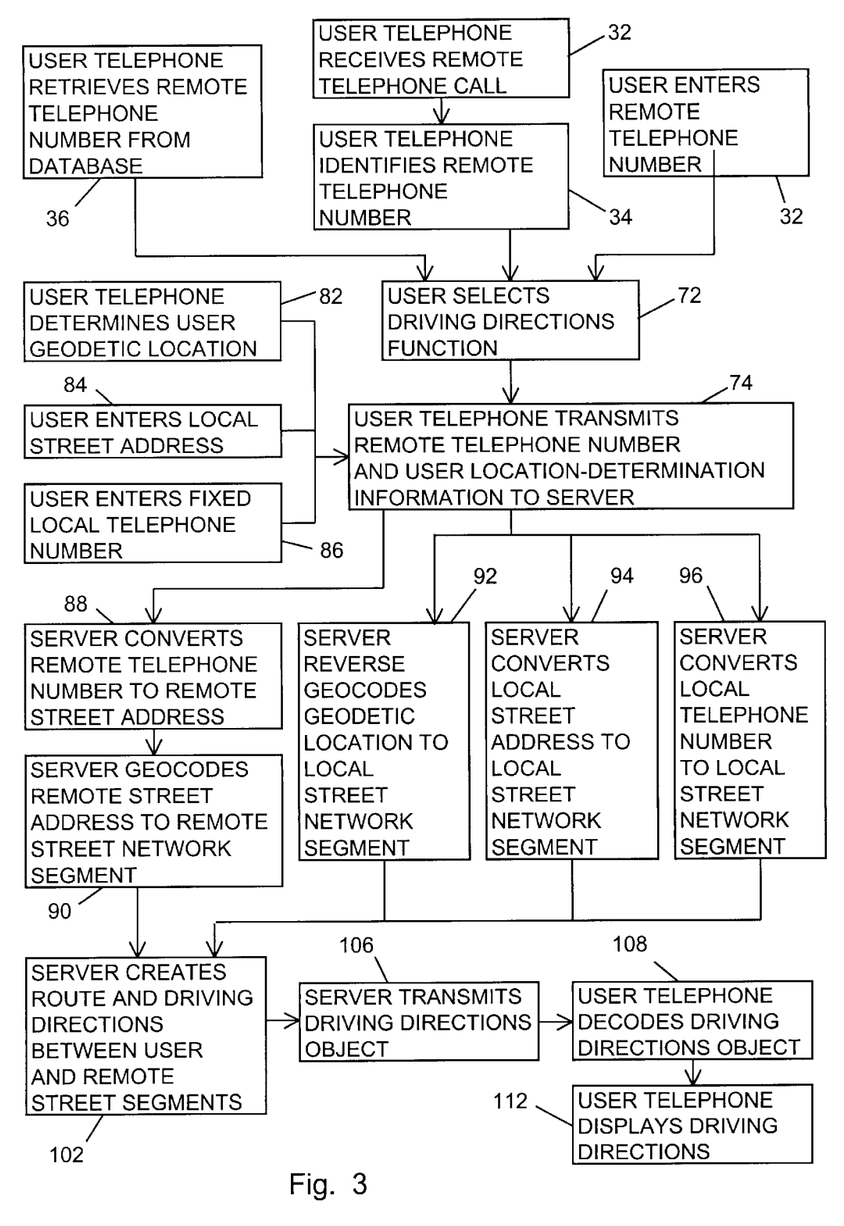
FIG. 3 is a flow chart for a method of the present invention for generating driving directions on the user telephone FIG. 1 to a remote location associated with a remote telephone number.

FIG. 3 is a flow chart of a method for generating driving directions from a local location of the user telephone 12 to a remote location associated with the remote telephone 18. At the start, the user telephone 12 uses the location number designator 22 for designating a remote telephone number as described above for the steps 32–38. Then, in a step 72 the user selects the desired function from the user telephone 12, for example, "driving directions". In a step 74 the user telephone 12 transmits a telephone message having the remote telephone number and user location-determination information as message data through the telephone system 16 to the server 14. As described above, this use of the remote telephone number differs from the standard use of a telephone number in a message header for routing and switching the telephone message through the telephone system 16.

The user location-determination information can be designated in any one of three ways. First, the user telephone 12 may include a geodetic location device 26, such as a global positioning system (GPS) receiver. Then, in a step 82, the geodetic location device 26 provides the local location as a geodetic location such as latitude and longitude. Second, in a step 84 the user may enter the user location-determination information in the form of a local street address. Third, in a step 86 the user may enter the location-determination information in the form of a fixed local telephone number. The fixed local telephone number may be the telephone number for the user telephone 12 when the user telephone 12 has a fixed location, or may be the telephone number of a nearby fixed telephone that is entered by the user. Alternatively, in the steps 84 and 86 the user may enter any address or telephone number, respectively, from a telephone book.

The server 14 in a step 88 converts the remote telephone number to an associated remote street address. If the remote telephone number is found to be invalid, the server 14 transmits an error indication through the telephone system 16 back to the user telephone 12. In a step 90 the server 14 geocodes the remote street address to a remote street network segment such as a street intersection or a section of a street between intersections at either end.

When the user location-determination information has the form of a geodetic location, in a step 92 the server 14 reverse geocodes the geodetic location to a local street network address segment. In a step 94 when the user location-determination information has the form of a street address, the server 14 converts the street address to the local street network segment. In a step 96 when the user location-determination information has the form of a local telephone number, the server 14 converts the local telephone number to the local street network segment. If the local telephone number is found to be invalid, the server 14 transmits an error indication through the telephone system 16 back to the user telephone 12.

The server 14 in a step 102 creates a route and driving directions between the local street network segment and the remote street network segment. In a step 106 the server.14 encodes the driving directions as a driving directions object. In a step 108 the server 14 transmits the driving directions object through the telephone system 16 to the user telephone 12. In a step 112 the object decoder 24 in the user telephone 12 decodes the driving directions object into driving directions. Then, in a step 114 the user telephone 12 displays the driving directions to the user of the user telephone 12.

Figure 4:
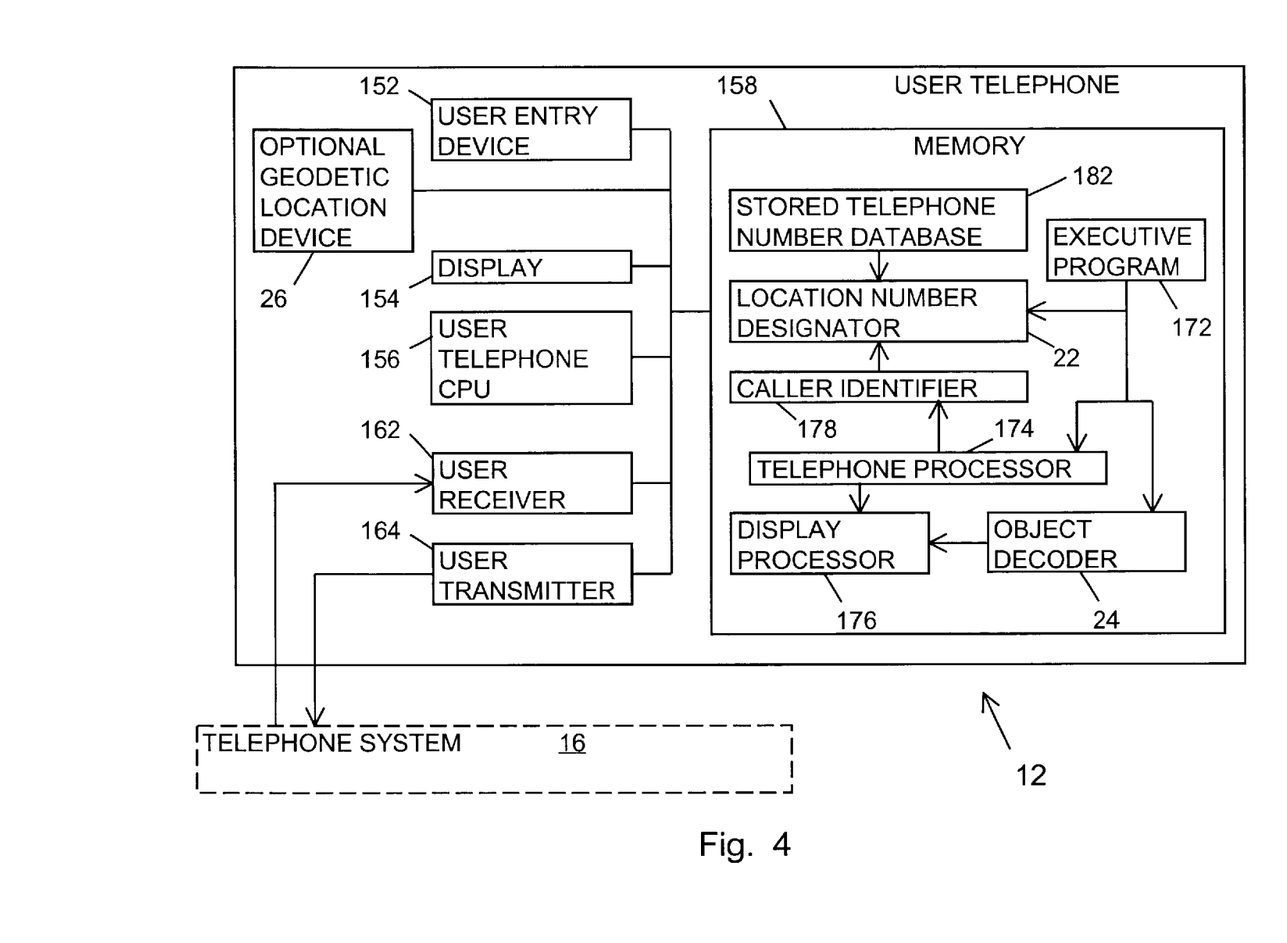
FIG. 4 is a block diagram of the user telephone of FIG. 1.

FIG. 4 is a block diagram of the user telephone of the present invention referred to by the reference number 12. The user telephone 12 includes the optional geodetic location device 26, a user entry device 152, a display 154, a user central processing unit (CPU) 156, a memory 158, a user receiver 162, and a user transmitter 164. The user entry device 152 includes a manual entry unit such as a keypad for enabling the user of the user telephone 12 to enter the functions of "map" and "driving directions" of the present invention and telephone numbers, addresses, and telephone operation functions, such as power, talk, send, end, recall, store, and the like for a standard telephone. Menu navigation keys such as next, back, home, menu, and the like are also included. The user entry device 152 also includes a microphone for receiving sound waves from the user intended to transmitted in telephone messages to users of other telephones. The display 154 includes a visual display such as a liquid crystal display and a speaker. The visual display issues telephone operational information and issues maps and driving directions according to the present invention. The speaker issues sound waves for telephone messages from users of other telephones. The user receiver 162 receives telephone calls and messages from the telephone system 16. The user transmitter 164 transmits telephone calls and messages into the telephone system 16. The user CPU 156 operates in a conventional manner for reading and writing instructions and data into the memory 158 and coordinating the activities of the geodetic location device 26, the user entry device 152, the display 154, the user receiver 162, the user transmitter 164, and programs in the memory 158.

The memory 158 includes an executive program 172 and task programs including the location number designator 22, the object decoder 24, a telephone processor 174, a display processor 176, a caller identifier 178, and a stored number database 182. Arrow lines within the memory 158 in the illustration of FIG. 4 show the primary paths and directions of information flow between the executive program 172 and the task programs, however, they do not necessarily show all possible information passing between the executive program 172 and the task programs as structures of interactions between coded programs in a memory are well known. The user CPU 156 follows programmed instructions in the executive program 172 for passing control among the task programs. The task programs have instructions for directing the user CPU 156 for their respective tasks.

The telephone processor 174 includes all of the instructions required for operating the user telephone 12 as a cellular telephone or fixed telephone. The display processor 176 includes instructions for issuing audible and visible information with the display 154. The caller identifier 178 identifies the remote telephone number for incoming telephone calls. The stored telephone number database 182 stores telephone numbers that are selected by the user of the user telephone 12. The location number designator 22 designates the remote telephone number that is to be used for the remote location for generating a map or the destination location for generating driving directions.

The object decoder 24 decodes a software object received in a telephone message from the server 14. The software object can be a map object having information for a map area about the remote location or a driving directions object having information for driving directions to the remote location. The map object may be a hypertext markup language (HTML) document, a wireless markup language (WML) document, a Java class, an extensible markup language (XML) document, or the like.

The HTML and the WML documents include map data and display semantics but not program code or data context. The object decoder 24 for the HTML document includes an HTML microbrowser having program code and context information for rendering the HTML document. The object decoder 24 for the WML document includes a wireless access protocol (WAP) program code for rendering the WML document. The map data in the HTML and WML documents is contained in a form such as graphics interchange format (GIF), joint photographic experts group (JPEG) image, progressive network graphics (PNG) image, or the like.

The Java class map object includes both map data and program code. The object decoder 24 for a Java class map object includes a Java virtual machine (JVM) that is able to run the Java class program code. Preferably, the Java object decoder 24 also includes helper classes of library programs that reside permanently in the user telephone 12 for displaying items such as a button, a text field, an image, or the like. The Java object decoder 24 renders the map object either as an image or preferably as vectors. The image can be GIF, JPEG, PNG, or the like. The vectors can be textual labels and coordinates of end points of lines. The Java object decoder 24 enables a user to interact with the map, for example to click on a street, zoom in, zoom out, and enable/disable display of various street classes, labels, and points of interest. The Java object decoder 24 also displays the location of the user telephone 12 on the map. Preferably, the Java object decoder 24 caches enough map data to show location continuously as the user telephone 12 moves on the map within a local area without further map data from the server 14.

The XML document includes map data with context but no program code. The object decoder 24 for the XML document includes an XML microbrowser or Java application, for example a Java midlet, that is able to parse and display the XML document and draw the map.

Similarly, the directions object can be an HTML document, a WML document, a Java class, or an XML document and the object decoder 24 includes the HTML microbrowser, the WAP, the JVM, or the XML microbrowser, respectively, as described above. The HTML and WML documents include data and display semantics. The object decoder 24 renders the HTML document with the HTML microbrowser or the WML document with the WAP program code. The Java class includes both data and program code. The object decoder 24 for the Java class includes the JVM for executing the Java class program code within the user telephone 12. Preferably the object decoder 24 also includes helper classes of library programs for rendering a display of a button, text, images, and the like. For the XML document the object decoder 24 includes the XML microbrowser, a Java application, or a Java midlet for parsing and displaying the travel directions in the directions object. In the case of a map object, the display 154 issues a visual presentation of the map area with an indication of the position of the remote location. In the case of the driving directions the display 154 issues a list of instructions on the visual display or through the speaker or issues highlighted lines and directions on the visual display.

Figure 5:
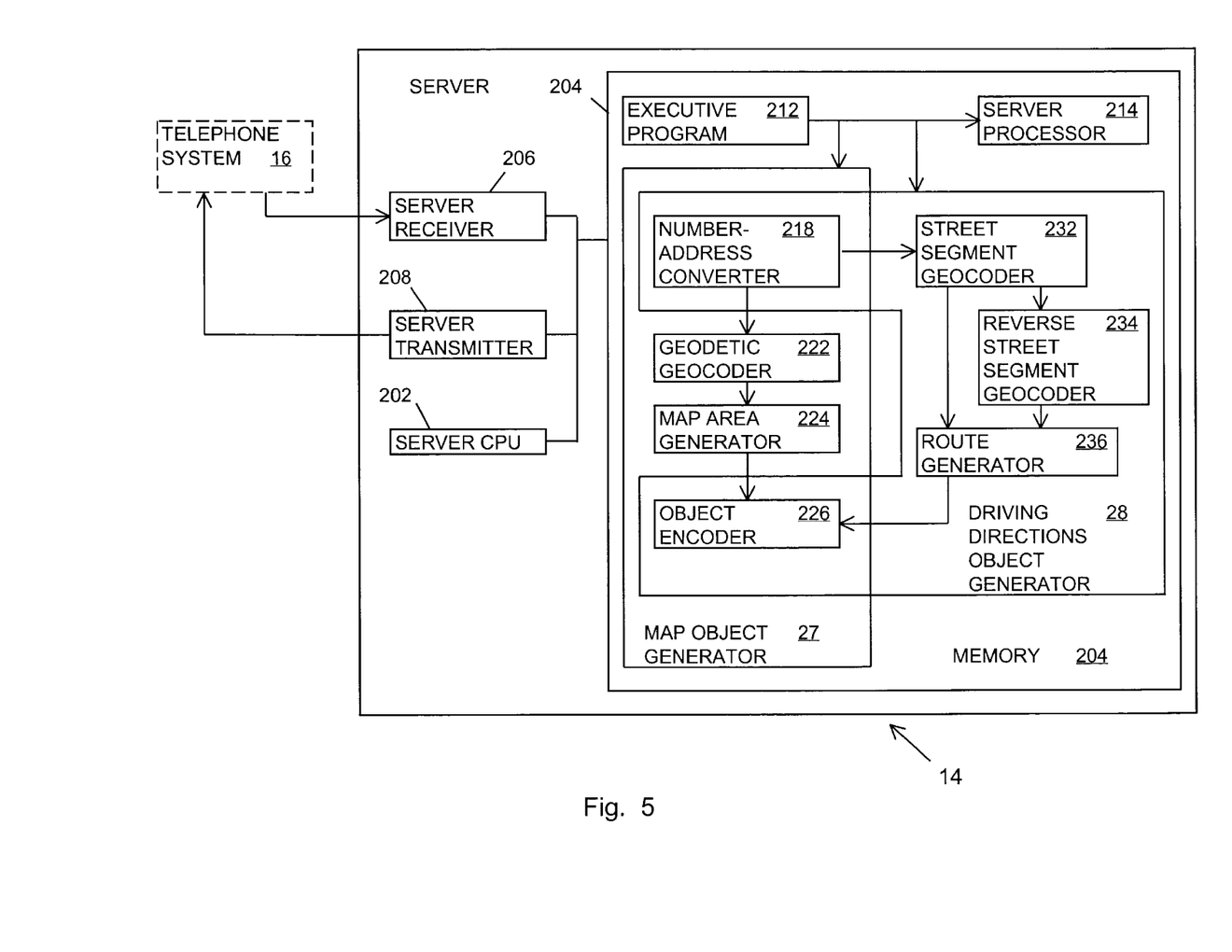
FIG. 5 is a block diagram of the server of FIG. 1.

FIG. 5 is a block diagram of the server of the present invention referred to by the reference number 14. The server 14 includes a server central processing unit (CPU) 202, a memory 204, a server receiver 206, and a server transmitter 208. The server CPU 202 operates in a conventional manner for reading and writing instructions and data into the memory 204 and coordinating the activities of the server receiver 206, the server transmitter 208, and programs in the memory 204. The server receiver 206 receives telephone messages from the telephone system 16. The server transmitter 208 transmits telephone calls and messages into the telephone system 16.

The memory 204 includes an executive program 212 and task programs including the map object generator 27, the driving directions object generator 28, and a server processor 214. The arrow directions in the memory 204 in the illustration of FIG. 5 show the primary paths and directions of information flow, however, they do not necessarily show all possible information passing between the executive program 212 and the task programs as structures of interactions between coded programs in a memory are well known. The server CPU 202 follows programmed instructions in the executive program 212 for passing control among the task programs. The task programs have instructions for directing the server CPU 202 for their respective tasks. The server processor 214 includes all of the instructions required for operating the server 14 and connecting the server 14 into the telephone system 16.

The map object generator 27 includes a number-address converter 218, a geodetic geocoder 222, a map area generator 224, and an object encoder 226. The number-address converter 218 includes a database of street addresses associated with telephone numbers for converting telephone numbers to street addresses. The geodetic converter 222 includes a database of geodetic coordinates such as latitude and longitude associated with street addresses for converting a street address received from the number-address converter 218 to geodetic coordinates. The map area generator 224 includes a map database for generating a map of the area about the geodetic coordinates received from the geodetic converter 222. The object encoder 226 encodes the map received from the map generator 224 into an object format such as an HTML document, a WML document, a Java class, or an XML document as describe above. When the server receiver 206 receives a telephone message having a remote telephone number as message data from the user telephone 12, the map object generator 27 creates the map object for the area about the remote location associated with the remote telephone number and the server transmitter 208 transmits the map object in a telephone message to the user telephone 12.

The driving directions object generator 28 includes the task programs for the street address converter 218, the object encoder 226, a street segment geocoder 232, a reverse street segment geocoder 234, and a route generator 236. The number-address converter 218 operates as described above for converting telephone numbers to street addresses. The street segment geocoder 232 includes a database of street addresses and associated street network segments for converting a street address received from the number address converter 218 to a street network segment. The reverse street segment geocoder 234 includes a database of geodetic coordinates and street network segments and uses map matching for converting geodetic coordinates to a street network segment. The route generator 236 generates a route and driving directions between a starting street network segment and a destination street network segment. The object encoder 226 encodes the driving directions into an object format as described above.

When the server receiver 206 receives a telephone message having user location-determination information and a remote telephone number as message data from the user telephone 12, the number-address converter 218 and the street segment geocoder 232 convert the remote telephone number to the remote street network segment. When the user location-determination information is a local telephone number, the number-address converter 218 and the street segment geocoder 232 convert the local telephone number to a user street network segment; or when the user location-determination information is a local address, the street segment geocoder 232 converts the local address to the user street network segment; or when the user location-determination information is in the form of geodetic coordinates, the reverse geocoder 234 converts the geodetic coordinates to the user street network segment. The route generator 236 uses the user street network segment as the start location and the remote street network segment as the destination location for generating the route and driving directions. The object encoder 226 encodes the driving directions as the driving direction object and the server transmitter 208 transmits the driving directions object in a telephone message to the user telephone 12.

Although the present invention has been described in terms of the presently preferred embodiments, it is to be understood that such disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is:

1. A method for generating driving directions, comprising steps of:

designating a remote telephone number in a user telephone having a local telephone number different than said remote telephone number;

determining local geodetic coordinates at said user telephone;

transmitting an outgoing telephone call having said local geodetic coordinates and information for said remote telephone number to a server having a server telephone number different than said remote telephone number;

converting said local geodetic coordinates to a local street network segment in said server;

transmitting a return message to the user telephone number from said server, said return message having driving directions from a local location of the user telephone to said remote location; and using said local street network segment as a start and said remote street network segment as a destination for generating said driving directions.

2. The method of claim 1, wherein:

the step of designating said remote telephone number comprises steps of receiving at said user telephone an incoming telephone call from a remote telephone having said remote telephone number and designating said remote telephone number from header data in said incoming telephone call.

3. The method of claim 1, wherein:

the step of designating said remote telephone number comprises steps of retrieving a stored telephone number and designating said stored telephone number as said remote telephone number.

4. The method of claim 1, further comprising:

converting said remote telephone number to a remote street network segment in said server.

5. The method of claim 4, further comprising:

converting said local telephone number to a local street network segment in said server.

6. The method of claim 5, further comprising:

using said local street network segment as a start and said remote street network segment as a destination for generating said driving directions;

encoding said driving directions as a driving directions object; and decoding said driving directions object in said user telephone.

7. The method of claim 1, further comprising:

determining a local address at said user telephone;

transmitting said local address in said outgoing telephone call; and converting said local address to a local street network segment in said server.

8. A system for generating driving directions, comprising:

a user telephone having a local telephone number and a geodetic location device for providing local geodetic coordinates, the user telephone for transmitting an outgoing telephone call including message data having said geodetic coordinates and a remote telephone number different than said local telephone number to a server having a server telephone number different than said remote telephone number and receiving an incoming message having driving directions information from a local location of the user telephone to a remote location associated with said remote telephone number; and the server including a server receiver for receiving said outgoing telephone call; a driving directions generator for generating said driving directions information, the driving directions generator including a reverse street segment geocoder for reverse geocoding said geodetic coordinates to a local street network segment and a route generator for using said local street network segment as a start location for said driving directions; and a server transmitter for transmitting said incoming message back to the user telephone.

9. The system of claim 8, wherein:

said driving directions generator includes a number-address converter for converting said remote telephone number to a remote address, a street segment geocoder for geocoding said remote address to a remote street network segment, and a route generator for using said remote street network segment for generating driving directions to said remote address.

10. The system of claim 8, wherein:

said driving directions generator includes a number-address converter for converting said local telephone number to a local address, a street segment geocoder for geocoding said local address to a local street network segment, and a route generator for using said remote street network segment as a start location for said driving directions.

11. The system of claim 8, wherein:

said outgoing telephone call includes a local address of the local telephone number; and said driving directions generator includes a street segment geocoder for geocoding said local address to a local street network segment and a route generator for using said local street network segment as a start location for said driving directions.

12. A cellular telephone having a local telephone number for providing driving directions, comprising:

a location number designator for designating a remote telephone number different than said local telephone number;

a geodetic location device for providing local geodetic coordinates of the cellular telephone;

a transmitter for transmitting an outgoing telephone call to a server telephone number different than said remote telephone number, said outgoing telephone call including said remote telephone number and information for said local geodetic coordinates; and a receiver for receiving an incoming message including driving directions information for a route between a local location of the cellular telephone and a remote location derived from said remote telephone number.

13. The telephone of claim 12, wherein:

said driving directions information is formed as a driving directions object.

14. The telephone of claim 12, wherein:

said outgoing telephone call includes information for a local address associated with the telephone.

15. The telephone of claim 12, further comprising:

a caller identifier for receiving said remote telephone number in an incoming telephone call; and wherein:

the location number designator is coupled to the caller identifier for designating said remote telephone number.

* * * * *